Figure 1:
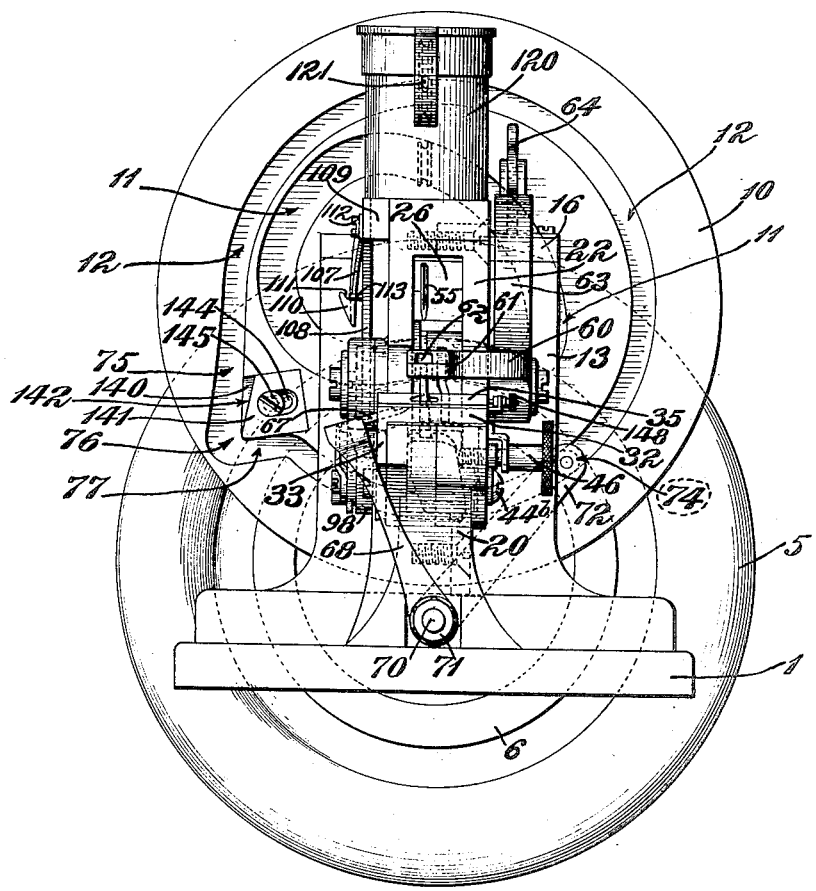

C. E. MYERS.
SEWING MACHINE.
APPLICATION FILED OCT. 7, 1912.

1,131,853.

Patented Mar. 16, 1915.
9 SHEETS—SHEET 1.

Witnesses:
Edgar T. Farmer
G. A. Pennington

Inventor:
Charles E. Myers,
By Pound & Pound
his Attys.

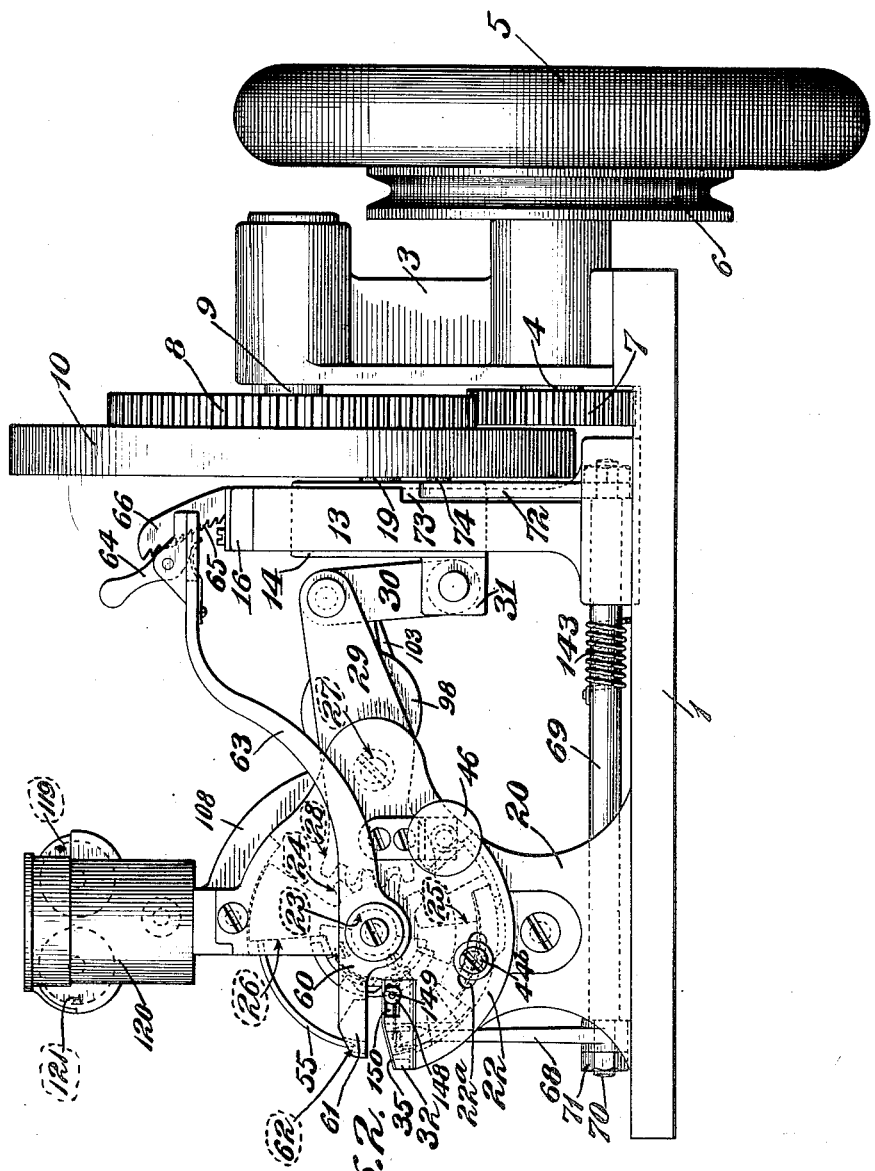

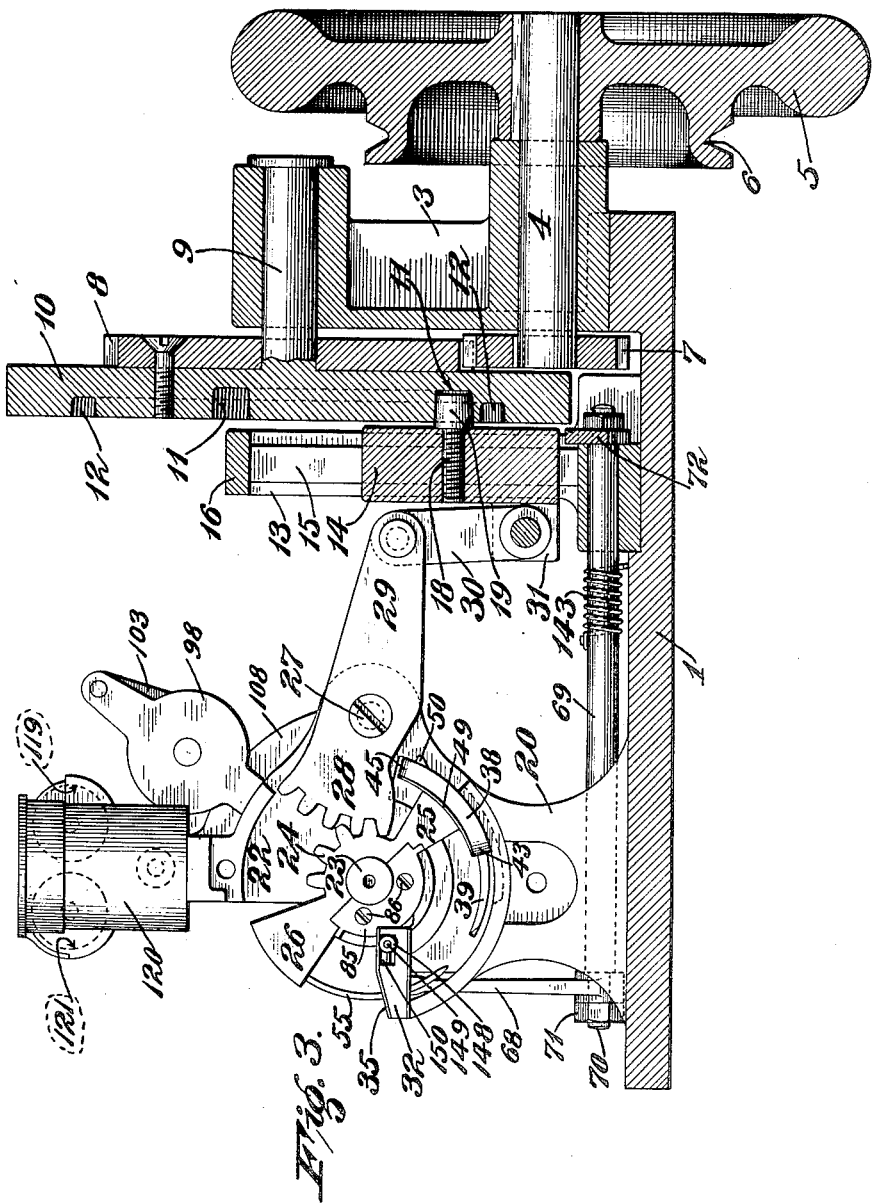

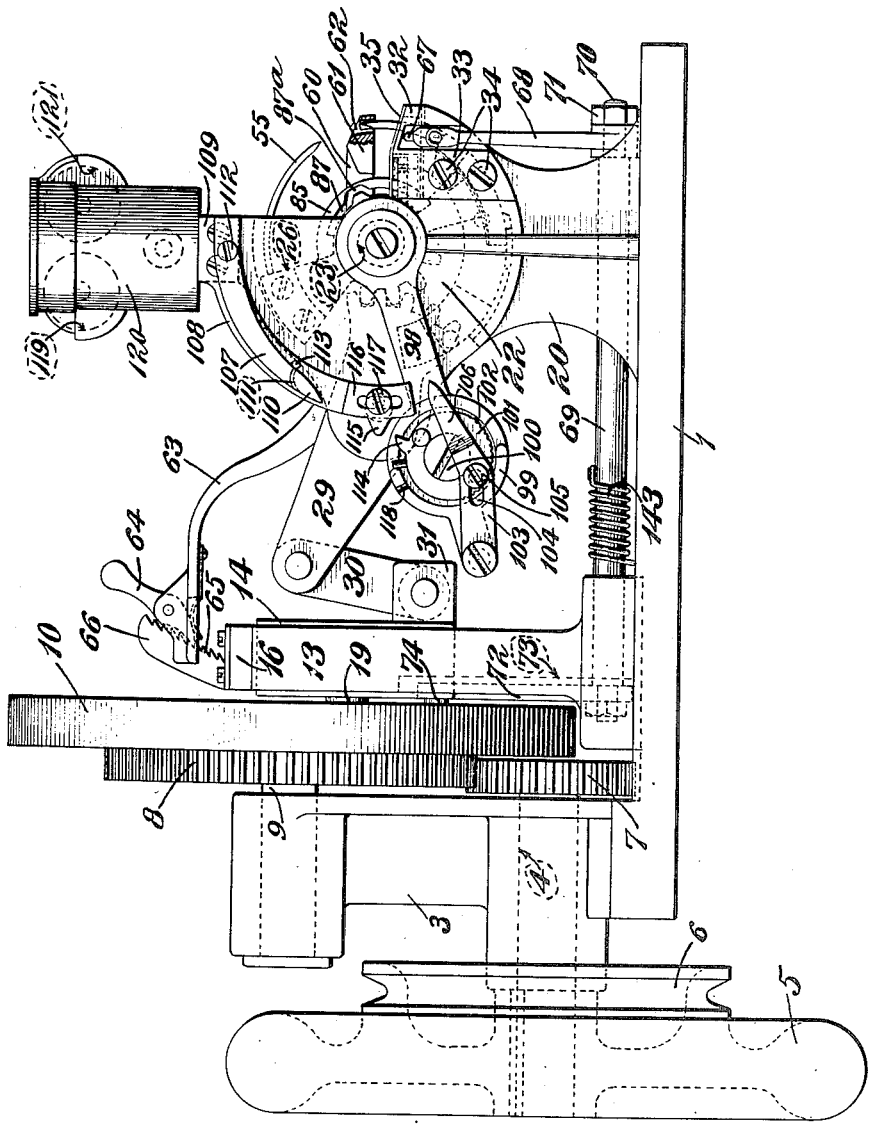

C. E. MYERS.
SEWING MACHINE.
APPLICATION FILED OCT. 7, 1912.
1,131,853.
Patented Mar. 16, 1915.
9 SHEETS—SHEET 5.
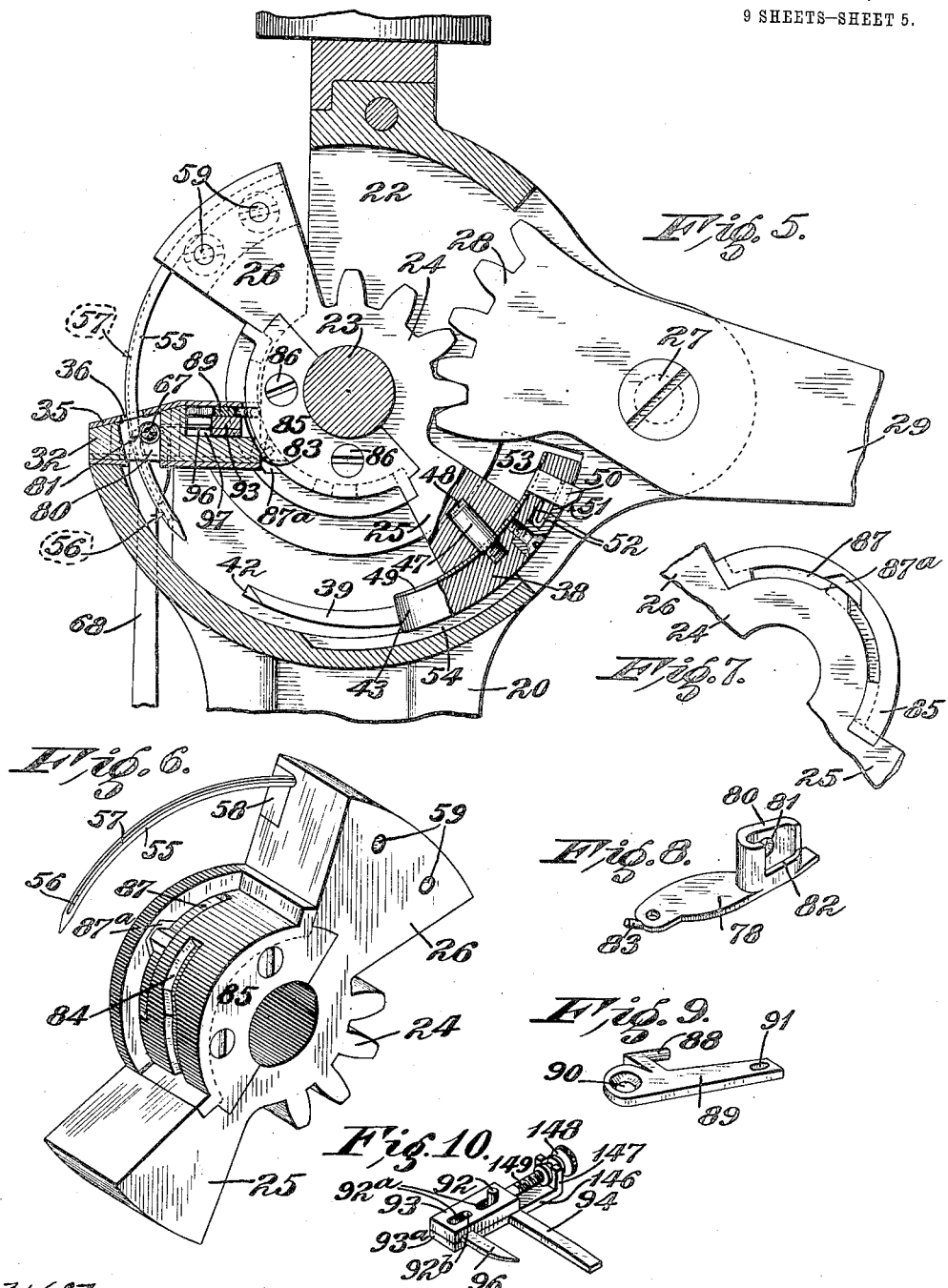

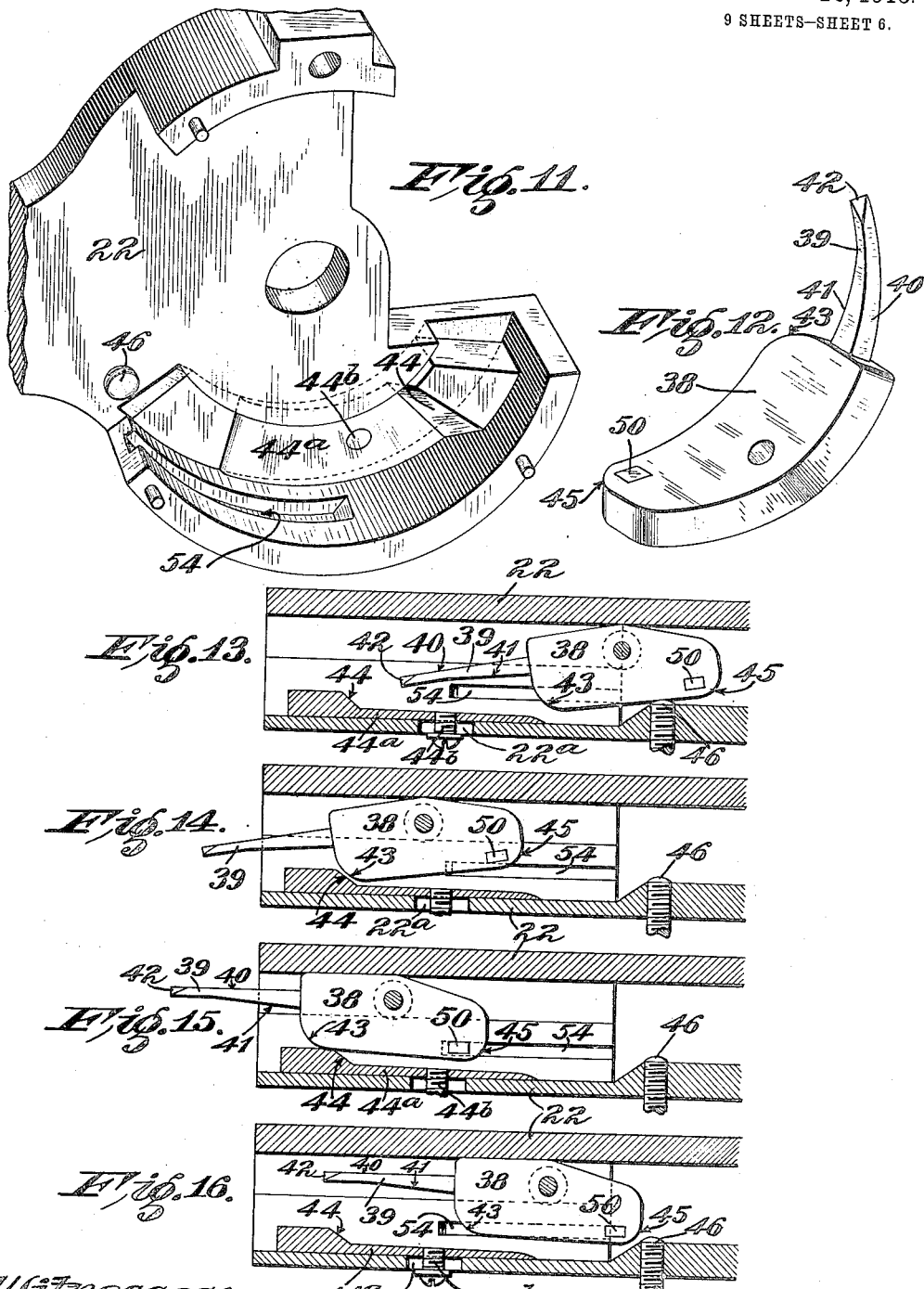

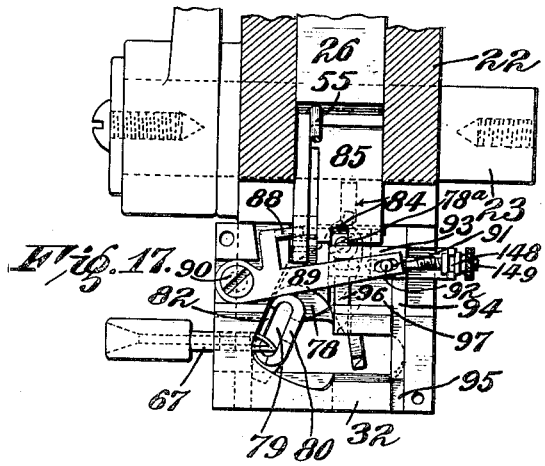
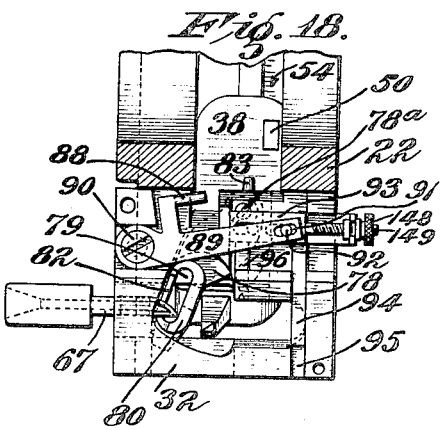
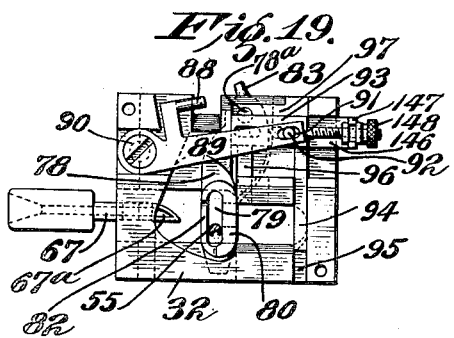
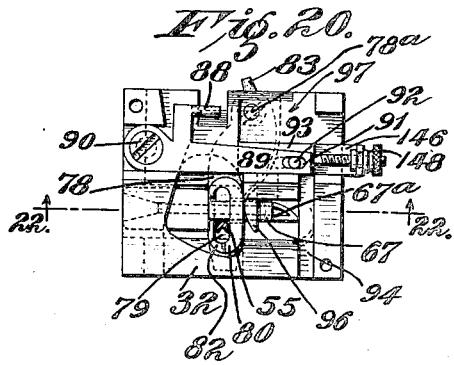
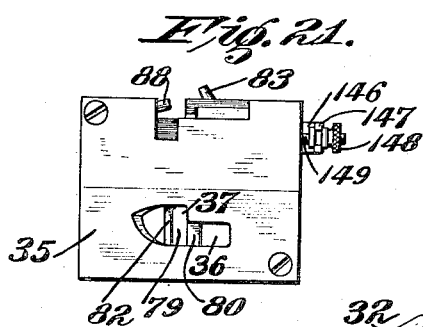
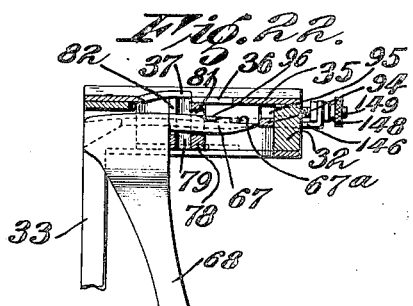
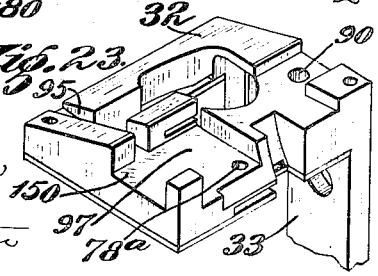

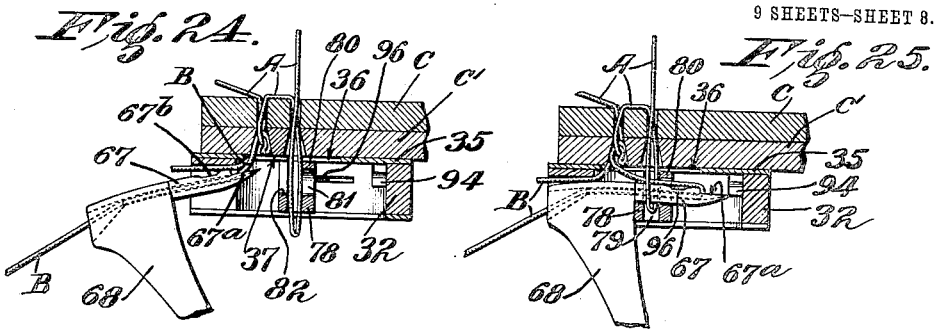

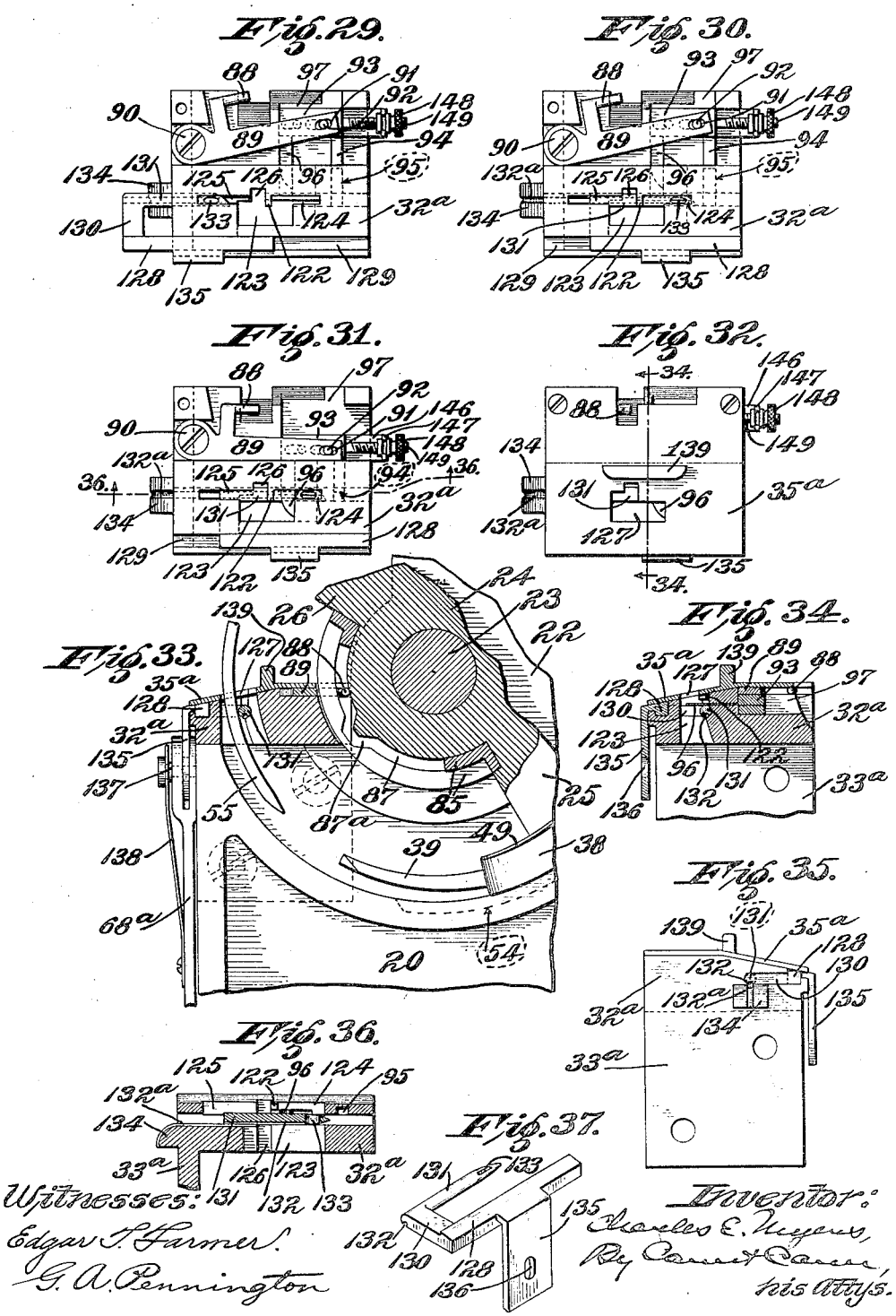

UNITED STATES PATENT OFFICE.

CHARLES E. MYERS, OF LEBANON, ILLINOIS, ASSIGNOR, BY MESNE ASSIGNMENTS, TO SIMPLEX SHOE MACHINERY COMPANY, OF ST. LOUIS, MISSOURI, A CORPORATION OF MISSOURI.

SEWING-MACHINE.

1,131,853.  Specification of Letters Patent.  Patented Mar. 16, 1915.

Application filed October 7, 1912. Serial No. 724,361.

*To all whom it may concern:*

Be it known that I, CHARLES E. MYERS, a citizen of the United States, and a resident of the city of Lebanon, in the county of St. Clair and State of Illinois, have invented a new and useful Improvement in Sewing-Machines, of which the following is a specification.

This invention relates to sewing machines and more particularly to loop-lock-stitch machines for sewing leather and similar materials.

It has for its principal objects to improve generally upon the type of machine shown in Patent No. 1,016,898, granted February 6, 1912; to produce regular and uniform stitching; to secure a positive action of the work-feeding and stitch-forming mechanism; and to attain certain advantages which will hereinafter more fully appear.

The invention consists in the parts and in the arrangements and combinations of parts hereinafter described and claimed.

In the accompanying drawings which form part of this specification and wherein like symbols refer to like parts wherever they occur, Figure 1 is a front elevation of a sewing machine illustrating an embodiment of the invention; Fig. 2 is an elevation of the right hand side of the machine; Fig. 3 is a vertical longitudinal section and elevation looking at the right hand side of the machine with parts removed; Fig. 4 is an elevation of the left hand side of the machine; Fig. 5 is an enlarged fragmentary view, partly in vertical section and partly in elevation, of the head and working parts mounted thereon; Fig. 6 is a perspective of the oscillatory needle and awl carrier; Fig. 7 is a side elevation of a fragment of the needle and awl carrier, showing the cam slot which operates the locking thread loop-catcher; Fig. 8 is a perspective view of the needle thread loop guard; Fig. 9 is a perspective view of the lever member for the locking thread loop-catcher; Fig. 10 is a perspective view of the locking thread loop-catcher; Fig. 11 is a fragmentary perspective view of the portion of the head in which the needle and awl carrier works; Fig. 12 is a perspective view of the awl and its carrier; Figs. 13 to 16, inclusive, are schematic views showing the movements of the awl carrier; Fig. 17 is a fragmentary view of the portion of the head which supports the work and contains the stitch-forming elements, the parts of the mechanism being in their respective positions at the time the needle is up and the awl is about to puncture the work; Fig. 18 is a similar view, the awl being in its position after puncturing the work and just after shifting the work to bring the puncture in position to receive the needle; Fig. 19 is a similar view, the awl having backed out of the work, the needle thread guard having moved under the puncture, and the needle having moved through the guard and also through the work; Fig. 20 is a similar view, the needle having moved up slightly to open the needle thread loop, the locking thread loop carrier having moved through the needle thread loop, and the locking loop holder having moved through the loop on said carrier; Fig. 21 is a plan view showing the cover plate which constitutes the work table; Fig. 22 is a fragmentary section on the line 22—22 of Fig. 20, the cover plate being shown; Fig. 23 is a perspective view of the member which supports the work and contains the stitch forming elements; Figs. 24 to 27, inclusive, are views showing the progressive stages in the formation of a stitch; Fig. 28 is a section through two layers of material sewed together, illustrating the kind of stitch the machine makes; Figs. 29 to 31, inclusive, are plan views showing the different correlative positions of the parts of a modified construction and arrangement of the stitch-forming elements; Fig. 32 is a plan view showing a modification of the cover plate which constitutes the work table; Fig. 33 is a fragmentary view, partly in section and partly in elevation, of the portion of the head and the elements mounted thereon; Fig. 34 is a section on the line 34—34 of Fig. 32; Fig. 35 is a side elevation of the modified member which supports the work and contains the stitch-forming elements; Fig. 36 is a section on the line 36—36 of Fig. 31; Fig. 37 is a perspective view of the modification of the locking loop carrier shown in Figs. 29 to 36, inclusive.

The machine is mounted upon a base 1 which may in turn be mounted upon any suitable table or stand (not shown). The base 1 is provided at its rear with a standard 3 in the lower portion of which is journaled a driving shaft 4. Upon the outer end portion of this shaft is fixedly mounted a fly-wheel 5 and a grooved pulley 6 adapted to coöperate with a driving belt. A pinion 7 is fixedly mounted on the inner end of the driving shaft and meshes with a gear wheel 8. This gear wheel 8 is fixedly secured on the inner end of a shaft 9, which is journaled in the upper portion of the standard 3. Fixedly secured to the gear wheel 8 or on the shaft 9 is a cam disk or member 10. This cam disk or member is provided in its front face with two continuous cam grooves 11, 12 whose functions will hereinafter more fully appear.

Mounted on the base 1, close to the front face of the cam disk 10, is a vertically-disposed guide-frame or column guides 13 on which is slidably mounted a block or member 14. This block is preferably provided with grooves in its side edges which slidably fit vertical ribs 15 provided therefor on the inner side faces of the guide-frame or column-guides 13. The upper ends of the column-guides are connected by a cross bar or member 16. Projecting rearwardly from the block 14 is a stud 18 upon which is journaled a roller 19 which is adapted to fit in the lowermost portion of the cam groove 11 of the disk 10, whereby a vertically reciprocatory motion is imparted to said block when the cam disk 10 is rotated. Preferably, the roller 19 is slightly tapered and the sides of the cam groove 11 are correspondingly inclined.

Mounted on the forward portion of the base 1 is a standard 20. The upper portion of the standard 20 is formed into a circular head or housing 22 having flattened side walls; and the housing is preferably divided, or one of its side walls is made removable so that access may be conveniently gained to the interior of the housing. Journaled transversely of the housing is a rock-shaft 23 on which is fixedly mounted an oscillatory needle and awl jaw or carrier comprising a segment gear 24 which is provided with two oppositely-disposed segmental extensions or wings 25, 26.

Journaled on a transverse shaft 27 at the rear of the housing is a segment gear 28 which meshes with said segment gear 24. The segment gear 28 is provided with a lever-extension or rock-arm 29 which is pivotally connected to one end of a link-bar 30 whose opposite end is pivotally mounted between a pair of ears or lugs 31 on the front face of the vertically reciprocatory member 14, whereby, when said member is reciprocated vertically, the segment gear 24 and the rock-shaft 23 upon which it is fixed are rocked or oscillated.

The upper front portion of the housing 22 is cut away to provide a space for a work-table or shelf. The work-table or shelf preferably comprises a body 32 having a downturned portion 33 which is secured by screws 34 or by any other desirable means to the side wall of the housing. This table member 32 is recessed to receive certain elements of the stitch-forming mechanism to be presently described. It is covered by a plate 35 (see Fig. 21) which is provided with a slot elongated in one direction, as at 36, to permit the awl to shift laterally to feed the work, and also transversely, as at 37, to permit the needle thread loop to spread sufficiently to permit the locking thread loop carrier to move freely therethrough.

Pivotally mounted on the curved end face of the segmental wing or extension 25 of the segment gear 24 is an awl jaw or carrier 38 which is curved in a circular arc concentric with the rock-shaft 23 and works close to the circular inner face of the bottom of the housing 22. The awl 39 is detachably secured in said carrier. One side 40 of the awl is straight and preferably in a plane close to the pivot but the opposite side 41 is inclined away from said first mentioned side for a considerable distance rearwardly from the piercing end thereof. This piercing end is beveled to a straight diagonally-disposed sharp cutting edge 42.

The awl jaw or carrier has, on the side adjacent to the inclined side 41 of the awl, a cam portion 43 which is adapted to coöperate with an inclined lug or cam projection 44 provided therefor on the inside of the housing. When the awl carrier is moved forward by the rock shaft 23, the cam face 43 is moved against the cam face 44, with the result that said awl carrier is swung laterally on its pivot. The cam faces 43, 44 are so positioned that this swinging of the awl carrier is effected just after the awl has pierced the work and while it is still in engagement therewith. By this arrangement, the awl moves or feeds the work intermittently a predetermined distance into position to be again pierced for the next succeeding stitch. On the opposite end of the awl carrier is a cam face 45 which is adapted to coöperate with an adjustable projection or screw-stud 46 provided therefor on the side of the housing 22 adjacent thereto. By this arrangement, the awl carrier is swung laterally on its pivot toward the projection 44 during its downward or rearward stroke and after the awl has backed out of the work.

By adjusting the projection or screw-stud 46 toward or away from the awl carrier the length of the stitch may be varied; that is, the cam projection 44 on casing being fixed, the awl is always shifted laterally in one direction to a certain common position; and by varying the position of the inwardly projecting end of the stud 46, the distance that the awl is shifted toward said cam projection 44 can be varied. Therefore, as the awl is always shifted to a common point in the direction the work is fed, the length of the stitches may be varied at will, by merely adjusting the projection or stud 46.

In order to adjust for initial set-up and for wear of the cam faces 43, 44, the cam 44 is preferably provided on a plate 44ª which is adjustably secured to the housing 22 by a screw 44ᵇ which is inserted from the outside through a slot 22ª in the side wall of the housing. By this arrangement the cam 44 may be easily adjusted to the proper position.

In order to allow a compensating movement to the awl carrier 38 which, however, is slight as the carrier oscillates during its reciprocatory movements, owing to the curvature of the face on which it slides, the carrier is provided with a fixed pivot stud 47 which is slidable longitudinally as well as rotatably in a bore 48 in the segmental extension 25 of the oscillatory carrier (see Fig. 5).

A flat leaf spring 49 is interposed between the peripheral face of the extension 25 and adjacent face of the awl carrier. Normally, this spring is straight, and as it is bent under tension when the awl carrier is mounted, its force holds the carrier in frictional engagement with the curved face of the housing 22. The spring has a hole at its middle so that the stud 47 may be passed therethrough, the end portions of the spring being free to slide so as to allow the awl carrier to move toward the segmental extension 25. The awl carrier 38 is also preferably provided with a latch-pin or block 50 having a beveled end portion 51. This latch-pin is slidably fitted in a hole extending through the awl carrier radially with respect to the axis of the rock-shaft 23, near the end of the carrier opposite to that on which the awl is mounted. A spring 52 is provided so as to normally hold the latch-pin 50 outward; and the leaf spring 49 is provided with a slot 53 so that the inner end of the latch-pin may pass therethrough and not interfere with the working of said spring 49.

When the awl carrier is all the way back, the outer end of the latch-pin 50 is projected by the spring 52 into the space at the rear of the housing 22 where the segment gear 28 works, this position of the awl carrier being best illustrated in Figs. 5 and 13. As the awl carrier moves forward, as shown in Fig. 14, the beveled portion 51 of the latch-pin engages the edge of the housing 22 where begins the curved surface on which the awl carrier travels. The latch-pin is thereby forced inward against the tension of the spring 52 and rides on said curved surface of the housing. When the cam face 43 of the awl carrier rides in engagement with the cam face 44 on the housing, the carrier is shifted on its pivot and the end of the latch-pin 50 is forced by the spring 52 into a groove 54 in said curved face of the housing. The awl carrier is thereby locked in the position to which it has moved in feeding the work (see Fig. 15) and it is thus held while the awl is backing out of the work; the latch-pin 50 being moved beyond the end of the groove 54 before the cam face 45 engages the projection or stud 46 which shifts the awl carrier to bring the awl back to puncturing position. By this means, the work is held positively while the awl is backing out, thereby preventing the work from being accidentally shifted so that the puncture would not be in line with the needle.

On the upper segmental wing 26 of the segment gear 24 is mounted a needle 55. The needle is curved in a circular arc on the same radius and center as the awl and it is located in position to enter the hole pierced in the work by the awl, but after the work has been shifted by the awl. As shown more clearly in Fig. 6, the needle is provided with an eye 56 and an elongated groove 57 on its outer side which extends from the eye to, or nearly to the shank. This groove is designed to accommodate the bight of the needle thread when it is carried by the needle through the hole in the work and to hold the thread in place as the needle reciprocates up and down. The needle is firmly held by a plate 58 which is fitted in a recess provided therefor in the member 26 and secured by screws 59.

Pivoted on the rock-shaft 23 is a presser-foot or work-holder 60. The front end of this presser-foot has a lateral horizontal extension 61 which has a hole 62 to permit the passage therethrough of the awl and needle. It also has a rearwardly and upwardly curved arm 63 which is provided at its end with a pawl 64. The pawl engages ratchet teeth 65 on a member 66 secured on top of the cross piece 16 of the guide frame 13, so that the presser-foot may be raised or lowered to accommodate different thicknesses of work and locked in adjusted position.

In practice, the presser-foot is adjusted at such a distance above the work-table that the work thereon will be held firmly against vertical movement, but may be moved ahead by the awl for each succeeding stitch without raising the presser-foot therefrom. The end portion of the arm 63 of the presser-foot or work-holder is preferably a strong spring so that the work may be held close to the work-table and yet the presser foot will yield sufficiently to compensate for any unevenness in the thickness of the work as the latter slides thereunder.

The locking loop forming and laying mechanism comprises a reciprocatory loop former and carrier 67. As shown in Figs. 1 to 27, inclusive, the member 67 is mounted on an oscillatory arm 68 which is fixed on a horizontal rock-shaft 69 extending longitudinally of the machine and journaled in the standard 20 and base of the column-guide frame 13 near the bed or base 1. The carrier 67 is tubular so that the thread may be taken through it and its end portion is cutaway on top, as at 67$^a$, and pointed, the point being at the side which lies toward the needle and formed by rounding or beveling from the opposite side and bottom.

The end portion of the rock-shaft 69 that receives the oscillatory arm 68 is preferably reduced in diameter, as at 70, to provide a shoulder against which the arm 68 may be clamped by a nut 71. By this arrangement, the arm may be adjusted to different positions relative to a lever-arm 72 which is fixed on the inner end of said shaft 69. The rear side of the guide-frame 13 is preferably cut away, as at 73, to provide space for the lever-arm 72, and the lever-arm is provided at its free end with a stud or roller 74 which works in the cam groove 12 of the disk 10.

The cam groove 12 extends concentrically around the cam disk 10 except for a short distance as at 75 (see Fig. 1), where it is gradually inclined outward to the point 76 and then turns abruptly back to its circular portion, as at 77. This outwardly inclined cam portion is so positioned with relation to the other cam groove 11 that the lever-arm 72 is moved outwardly and thereby actuates the rock-shaft 69 and its arm 68 which moves the locking-loop carrier 67 across the inner side of the needle as said needle is starting on its upward stroke. By reason of the resistance of the material of the work upon the needle thread at the inner side of the needle, the bight or loop of the needle thread opens inwardly as the needle backs out of the work.

In order to prevent the needle thread loop from swinging laterally with the locking thread loop-carrier 67 as the latter moves therethrough, a guard comprising an oscillatory member 78 is pivoted, as at 78$^a$, to swing in a horizontal plane on the table member 32. This guard has an elongated slot 79 which is surrounded by an upstanding flange 80. The flange has a hole 81 on the side away from the locking thread loop-carrier so that the latter may move therethrough, and the side toward said carrier is cutaway, as at 82, to permit the member 78 to swing under the end of the carrier (see Figs. 17 and 18) out of the way of the awl during the lateral movement thereof to feed the work. This oscillatory member 78 is provided with a pin extension 83 which works in a cam slot 84 in the peripheral face of a segmental member 85 fitted on the oscillatory needle and awl carrier and detachably secured by screws 86 (see Figs. 3, 5 and 6). The member 85 is also provided with a cam slot 87 in its side face. This cam slot receives a pin extension 88 on a lever member 89 which is pivoted at 90 on the table member 32. The free end of the lever member 89 is provided with a slot 91 in which works a pin 92 on a reciprocatory locking thread loop-catcher 93. As shown more clearly in Fig. 10, the loop-catcher comprises a rectangular block having a guide extension 94 which slides in a groove 95 provided in the table member 32, and a finger or blade 96 having a relatively thin and pointed end. The body of the loop-catcher works in a recess 97 in the table member 32, best shown in Fig. 23, and it is reciprocated by the lever member 89 whose extension 88 works in the cam slot 87.

The carrier 67 is provided with a recess 67$^b$ adapted to receive the blade 96 so as not to pierce the thread. The blade 96 is somewhat resilient and is normally in a plane to engage the carrier tangentially under the thread; and it will yield as the carrier moves back, the ends of the recessed portion being beveled or rounded. The cam slot 87 is concentric for the greater portion of its length with the axis of the oscillatory needle and awl carrier. About midway between its ends it is offset, as at 87$^a$, so as to effect a rather sudden reciprocation of the loop-catcher with a short pause between its out and in movements. The blade or finger 96 of the loop-catcher moves outward across the locking-loop carrier 67 and under the locking thread thereon after the carrier has moved through the needle thread loop-guard 80 (see Fig. 20). The loop-catcher remains in its out position just long enough to hold the locking thread loop until the carrier moves back to normal position and thereby prevents the locking thread loop from being pulled out of the needle thread loop during the back stroke of the carrier.

The arrangement of the cam slot 87 is such that the blade or finger 96 makes an idle stroke between each of its loop engaging strokes. This movement has no effect on the operation of the stitch-forming mechanism.

The operation of so much of the machine as has been described is as follows: The work is placed upon the work-table and the presser foot is adjusted to hold the work to the table. Then the cam disk 10 is rotated and the block 14 is thereby reciprocated; and, through the gear connections, the awl and needle carrier is oscillated. Assuming the parts to be in the positions shown in Fig. 5, the awl will first be carried upwardly to pierce the work. Near the end of its upward stroke the awl is shifted laterally to feed the work and thereby bring the puncture therein into position to receive the needle after the awl shall have backed out of the work. As the awl approaches the end of its downward stroke it is shifted back into position to pierce the work for the next stitch. The needle, on its downward stroke, carries a bight of its thread through the work and the guard 80 thereunder and as the needle backs out of the work, the bight of its thread is opened within the guard under the work (see Fig. 24). While the loop of the needle thread is opening, the carrier 67 lays the locking-loop thread through it and then backs quickly out, leaving the locking-loop extending through the needle loop, as shown in Figs. 25 and 26. While the carrier is in the position shown in Fig. 25, the catcher finger or blade 96 enters the locking thread loop and holds the loop as shown in Fig. 26 until the carrier has reached the end of its back stroke. The stitch is then drawn tight or set by pulling upon the needle thread, which operation is preferably accomplished by a thread-measuring and take-up device hereinafter more fully described. The blade 96 is, of course, withdrawn from the locking thread loop just before or soon after the take-up begins to set the stitch, and, in any case, before the interengaged loops are drawn into the work.

The measuring and take-up device for the needle thread is shown and described in the hereinbefore mentioned Patent No. 1,016,898 and also set forth and claimed with particularity in Patent No. 1,016,900. Generally described, it comprises an arm 98 which is fixed tightly on the rock-shaft 23; and it is so set with respect to the needle carrier segment 26 that it is in its lowermost position when the needle carrier segment is in its uppermost position. The arm 98 is provided near its outer end with a circular portion having a curved marginal flange or rib 99 on its outer side. Pivotally mounted on a stud 100 located at the center of the circular portion of the arm 98 is a cam disk 101 whose high side or portion which coöperates with the inner side of the rib 99 is preferably serrated or scalloped as at 102. A lever arm 103 is pivotally mounted on the outer end of the arm 98. It has a slot 104 therein which coöperates with a stud 105 on the cam disk 101. The free end of the lever arm is for convenience turned at an angle as at 106 and it is rounded or pointed so as to coöperate with a resilient latch member 107. This latch member is mounted on an arcuate extension 108 of a bracket 109 which is mounted on the top of the casing 22. The bracket extension 108 is preferably suspended laterally from the casing so as to be in convenient position relative to the arm 98. On the free end of the latch member 107 is provided a lug having a tapered or beveled side cam face 110 and a curved or grooved top cam face 111. The opposite end of the latch member is secured to the bracket extension by a screw or rivet 112 and it is additionally supported by a pin 113 upon which its intermediate free portion slidably rests.

Assuming the parts just described to be in the position shown in Fig. 4: When the arm 98 is swung upward, the end portion 106 of the lever 103 rides over the cam face 110 of the lug on the end of the resilient latch member 107, thereby pressing said member inwardly until the lever-arm has passed free of said lug. When the arm 98 swings downward on its return stroke, the end of the lever-arm 103 contacts with and rides over the grooved cam portion 111 of the latch member, whereby said lever-arm is shifted and, owing to its slot-and-pin connection with the cam disk 101 the disk is turned until its high side contacts with the inner face of the curved rib 99. As the arm 98 continues its downward movement a projection 114 on the cam disk 101 contacts with a projection 115 on the bracket extension 108, whereby the cam disk is turned and restored to open or inoperative position, the lever 103, of course, being also restored therewith to the position shown in Fig. 4. The projection 115 is preferably provided on a slotted plate 116 which is secured in adjusted position on the bracket extension 108 by a screw 117 or other suitable securing device. By adjusting the projection 115 to different positions peripherally of the arcuate bracket extension, the cam disk 101 may be made to move out of contact with the rib 99 at different intervals from the tripping lug on the end of the latch member 107 and thereby the amount of the needle thread taken up in the stitch may be varied.

In the operation of the thread-measuring and take-up device just described, the needle-thread is taken from some conveniently arranged source of supply, preferably, from a spool mounted or supported beneath the base 1 of the machine. The thread is carried through an opening in the base and thence through an ordinary tension device, not shown, but which may be conveniently mounted on the base or guide-frame 13. The thread is then carried between the inner side of said rib 99 and the cam disk 101, thence through a slitted guide opening 118 in the upper end portion of the rib, thence over a grooved idler or pulley 119 at the top of a wax pot 120 on the casing 22, and thence over another idler 121 and the outer side of the curved needle 55 and through the eye 56 of the needle. When the needle moves downward, it carries a bight of the thread with it. The end of the thread or portion thereof which is secured in the preceding stitch is, of course, tightly held, and, therefore, the thread from the supply spool is pulled through the tension device and the take-up device and over the idlers or pulleys. It is noted, also, that the take-up arm moves upwardly simultaneously with the downward movement of the needle. The tripping or latch member is so located that immediately, or shortly after, the take-up arm starts on its return or downward stroke, the lever arm 103 is actuated and the cam disk 101 binds the thread against the rib 99 on the take-up arm. The thread is then pulled until the cam disk is released from the thread by the projection 114 on said disk contacting with the projection 115 on the bracket extension 108. It is during this pulling action on the thread by said take-up device that the stitch hereinbefore described is tightened or set. The length of the thread used to form and set the stitch is controlled by the distance between the projection 115 and the tripping cam 111 on the member 107; and, as hereinbefore stated, said projection 115 may be adjusted at will with relation to said tripping cam 111 in order to measure the proper length of thread to suit different thicknesses of work or lengths of stitches. The locking-loop thread is also preferably supplied from a spool which may be located conveniently beneath the base 1 of the machine. The thread-waxing or treating material may be used in a fluid state, preferably an ethereal solution of a viscid substance or cement which becomes hardened when exposed to the atmosphere.

In Fig. 28 of the drawings, two layers C, C' of leather or similar material are shown stitched together according to this invention. As shown at the right-hand side of said figure 28 the puncture P in the lower layer C' is tapered or outwardly flared, while the puncture in the upper layer is straight and of a width corresponding to the inner end of the puncture in the lower layer. In practice, for stitching shoe soles to welts and similar work, it is preferable to use a six-cord linen thread for the upper or needle thread A and a ten-cord cotton thread for the bottom or locking-loop thread B. In the finished work, there will be four strands of the locking-loop thread and two of the needle thread pulled into a knot in the wedge-shaped puncture in the lower layer C', while there will be only two strands of the needle thread lying in the puncture in the upper layer C. As the thread is usually treated or waxed with a solution of the waxing or cementing material in a volatile solvent whose evaporation causes said material to harden or set, the hardened knot forms substantially a tapered head or peg which will not pull through the puncture in the upper layer when the locking-loop thread is cut or broken between the stitches. Therefore, a shoe sole stitched according to the invention can be worn close down to the welt without the stitches ripping, and the sole is more flexible than the ordinary lock-stitched and loop-lock-stitched soles, as the thread between the stitches need not be drawn as tight as it is necessary in the ordinary stitching. Moreover, it is not necessary to channel the bottom of the sole to accommodate the bottom thread between the stitches. The soles may be sand-papered and the bottom threads between the stitches obliterated from the surface, if desired, in which case the sole will not readily rip loose from the welt.

As above stated, a linen thread is needed for the upper or needle thread only and a much cheaper cotton thread may be used for the locking-loop thread. Hence, there is a saving in cost without sacrificing the quality and durability of the work.

In practice, as the tapered portion of the awl is forming the wedge-shaped puncture in the lower or sole layer C', the material surrounding the knot formed in the preceding stitch is pressed and closed tightly about the knot, thus adding further to the advantages of the peculiar form of stitch.

In Figs. 29 to 37, inclusive, a modified construction and arrangement of the work table member is shown. In this modification, the oscillatory needle thread loop guard member 78 is omitted, and the needle thread loop is prevented from moving with the locking thread loop-carrier by a projection 122 which extends into a slot in the top of the table member 32ª. The slot has a wide portion 123 which extends through to the bottom of the table, as best shown in Fig. 34, to permit the awl to reciprocate and oscillate therein. The slot extends on either side of the portion 123, as at 124 and 125, to provide clearance for the locking thread, and it is further widened, as at 126, to permit the needle thread loop to open sufficiently to allow the locking thread loop carrier to move freely through it. The cover plate 35ª in the modification has its slot 127 shaped substantially like the slot in the hereinbefore mentioned cover plate 35, so as to make clearance for the awl and also allow the needle thread loop to spread. The locking thread loop former and carrier in the modification comprises a reciprocatory member 128 which slides in a groove 129 in the table member 32ª. It has a lateral projection 130 from which a needle bar 131 projects parallel with the body portion 128. The needle bar has a groove 132 in the underside and an eye 133 near its end, the end being pointed, the point being at one side like the hereinbefore mentioned carrier member 67. The table member 32ª is also provided with a groove 132ª which under-lies the groove 132 of the needle bar 131, said groove extending over a rounded lug 134 provided on the side of the table member so as to avoid a sharp abrupt corner over which the thread is pulled from the supply spool. The thread is carried along the groove 132ª in the table member and groove 132 under the needle bar 131 and up through the eye 133.

The operation of the parts is substantially the same as those in the hereinbefore described construction; and the locking thread loop is securely held within the confines of the part 124 of the slot in the table member 32ª by the blade 96 of the loop-catcher 93 until the needle bar 131 has backed out of the needle thread loop. The carrier member 128 is provided with a down-turned extension 135 which has a vertically elongated slot 136 adapted to receive a stud or pin 137 on an oscillatory arm 68ª which is fixed on the rock-shaft 69 and has its end bifurcated to receive said extension 135. To permit the locking thread loop carrier to be readily disconnected from the oscillatory arm 68ª so that said carrier may be removed from the table 32ª to facilitate threading the needle-bar 131, the stud 137 is slidably fitted through holes in the bifurcated end portion of the oscillatory arm and releasably held by a spring 138. By this arrangement, the stud 137 may be easily withdrawn and the carrier slid out of the table member. The work table may be provided on its cover plate 35 or 35ª, as the case may be, with a lug 139 in the region of the slot through which the awl and needle move, so as to serve as an abutment against which the work may be held by the operator in guiding it.

As hereinbefore set forth, the length of the needle thread or stitching thread proper taken up for the respective stitches in different thicknesses of work is controlled and regulated by adjusting the tripping elements of the take-up device. So, too, the length of the locking thread loop may be varied to suit different thicknesses of work by changing the throw of the lever arms 68 or 68ª, as the case may be, so as to vary the distance the loop carrier travels, and also by changing the position of the catcher blade or finger 96 correspondingly. The throw of the lever arms 68 or 68ª may be varied by recessing or mortising the cam disk 10 in the region of the cam portion of the slot 12, as at 140, but not as deep as the slot, and slidably fitting therein a block or plate 141 having an inclined end or cam portion 142. When the block is all the way back, as shown in Fig. 1, the roller or projection 74 on the lever arm 72 rides on the normal inner side of the cam slot portion 75. To hold the lever arm with its roller 74 in such engagement with the wall of the cam slot, a spring 143 is wound about the rock-shaft 69 and has one of its ends secured to a stud or pin on the shaft and its opposite end in engagement with the base 1 of the machine. By moving the block outward the high corner of its cam edge is made to project beyond the normal inclined side of the cam slot and thereby cause the lever arm to make a longer swing; and the block may be moved outward until the lower corner comes flush with the side of the cam slot. As shown, the block 141 is provided with a slot 144 having beveled edges so as to receive a locking screw 145 whose head is tapered to correspond to said beveled edges. However, any other obvious or desirable fastening means may be employed. So, too, it is obvious that other means may be employed for changing the pitch of the cam, or for regulating the throw of the lever arms without changing the cam, as by changing the effective lengths of the lever arms. To vary the position of the catcher blade or finger 96 laterally, it is preferable to divide the member 93 which carries the blade and provide a slot-and-pin connection between the two sections. As shown more clearly in Fig. 10, the section 93 has slots 92ª through one of which the pin 92 projects up from the lower section 93ª; the other slot receiving a pin 92ᵇ whose upper end lies flush with or slightly below the top face of the member 93. The guide portion 94 is a part of the lower section 93ª, and said lower section also has an end extension 146 whose end portion is turned up, as at 147, and slotted or bifurcated to receive and provide a fixed bearing for an annularly grooved adjusting nut 148. The nut receives the screw-threaded portion of a stud 149 projecting from the end of the upper section 93. These coöperating extensions project through a slot 150 in the side of the table 32 or 32ª, as the case may be, so that the adjustments may be effected from the outside. By this arrangement the upper section carrying the catcher blade 96 may be adjusted to and held in different positions with respect to the lower section which reciprocates in the same location all the time. Hence, when it is desired to change the position of the catcher blade to suit a change in the stroke of the locking thread loop carrier, it is only necessary to manipulate the adjusting nut 148.

Obviously, the machine admits of considerable modification without departing from the invention. Therefore, I do not wish to be limited to the specific construction and arrangement shown.

What I claim is:

1. In a sewing machine employing a stitching thread and a loop locking thread, a needle adapted to take a loop of the stitching thread through the work and to spread open said loop, a carrier for said needle, means for laying a loop of the locking thread through the loop of the stitching thread while the needle is in the work, and means actuated by said needle carrier for engaging said locking thread loop while the laying means is moving out of the stitching thread loop.

2. In a sewing machine employing a stitching thread and a loop locking thread, a needle adapted to take a loop of the stitching thread through the work and to spread open said loop, means for laying a loop of the locking thread through the loop of the stitching thread while the needle is in the work, a loop holder for holding said spread open stitching thread loop in its own plane while the locking thread loop is being laid therethrough, and means for engaging said locking thread loop while the laying means is moving out of the stitching thread loop, said loop holder being provided with a slot to receive the stitching thread needle and loop, the needle passing through the slot adjacent to the end wall thereof, whereby the loop is formed at one side of the needle.

3. In a sewing machine employing a stitching thread and a loop locking thread, a table for supporting the work, said table having an opening therein, means for holding the work on the table, means for feeding the work, a needle adapted to take a loop of the stitching thread through the work and into the opening in said table, and means for laying a loop of the locking thread through the stitching thread loop comprising a reciprocatory loop carrier, and a reciprocatory member mounted on said table and adapted to move transversely and tangentially across said locking thread loop carrier to hold the loop during the back stroke of said carrier.

4. In a sewing machine employing a stitching thread and a loop locking thread, a table for supporting the work, said table having an opening therein, means for holding the work on the table, means for feeding the work, a needle adapted to take a loop of the stitching thread through the work and into the opening in said table, and means for laying a loop of the locking thread through the stitching thread loop comprising a reciprocatory loop carrier working through said table, means for supporting the stitching thread loop during the forward stroke of the carrier, and a reciprocatory member adapted to move transversely and tangentially across said locking thread loop carrier to hold the loop during the back stroke of said carrier.

5. In a sewing machine employing a stitching thread and a loop locking thread, a rocking carrier having an arcuate needle and an arcuate awl thereon, said needle and awl having their points facing each other, said needle being adapted to take a loop of the stitching thread through the puncture, a reciprocatory carrier adapted to lay a loop of the locking thread through said stitching thread loop, and a reciprocatory loop catcher adapted to move transversely of said locking thread loop carrier so as to engage and hold the loop during the back stroke of the carrier, said loop catcher being operated by a cam slot provided on said rocking needle and awl carrier.

6. In a sewing machine employing a stitching thread and a loop locking thread, a rocking carrier having an arcuate needle and an arcuate awl thereon, said needle and awl having their points facing each other, said needle being adapted to take a loop of the stitching thread through the puncture, a reciprocatory carrier adapted to lay a loop of the locking thread through said stitching thread loop, an oscillatory stitching thread loop guard adapted to hold the loop while the locking thread loop carrier is moving therethrough, and a reciprocatory loop catcher adapted to move transversely of said locking thread loop carrier so as to engage and hold the loop during the back stroke of the carrier, said rocking needle and awl carrier having cam slots adapted to actuate said stitching thread loop guard and said locking thread loop catcher, respectively.

7. In a sewing machine employing a stitching thread and a loop locking thread, a table for supporting the work, said table having a slot within which the loop lock is formed, a needle adapted to take a loop of the stitching thread through the work and to spread said loop in said slot, a reciprocatory carrier working through said slotted table and adapted to lay a loop of the locking thread through the spread stitching thread loop, a reciprocatory loop catcher working through said slotted table transversely of said locking thread loop carrier and adapted to engage and hold the locking thread loop during the back stroke of said carrier, said loop catcher coöperating with a portion of said slot to confine the locking thread loop therein.

8. In a sewing machine employing a stitching thread and a loop locking thread, a needle adapted to take a loop of the stitching thread through the work, means for laying a loop of the locking thread through the loop of the stitching thread, and a means for engaging said locking thread loop while the laying means is moving out of the stitching thread loop, said laying means and engaging means being adjustable correlatively to suit different thicknesses of work.

9. In a sewing machine employing a stitching thread and a loop locking thread, a table for supporting the work, means for holding the work on the table, means for feeding the work, a needle adapted to take a loop of the stitching thread through the work, means for laying a loop of the locking thread through the stitching thread loop comprising a reciprocatory loop carrier, a reciprocatory loop holder adapted to move tangentially across said locking thread loop carrier to hold the loop during the back stroke of said carrier, means for varying the stroke of said locking thread loop carrier, and means for changing the working location of said loop holder correspondingly.

10. In a sewing machine employing a stitching thread and a loop locking thread, a needle adapted to take a loop of the stitching thread through the work, means for laying a loop of the locking thread through the loop of the stitching thread, means for engaging said locking thread loop while the laying means is moving out of the stitching thread loop, and means for regulating the length of the stitching thread taken up in the respective stitches for different thicknesses of work, said locking thread loop-laying means and said loop-engaging means being also adjustable correlatively to suit different thicknesses of work.

11. In a sewing machine employing a stitching thread and a loop locking thread, a needle for carrying a loop of the stitching thread through the work, a reciprocatory carrier for the locking thread adapted to lay a loop of said thread through the stitching thread loop, adjustable means for varying the stroke of said carrier, and a reciprocatory catcher adapted to move transversely to said locking thread loop carrier, and means for varying the distance from the path of movement of said needle to the working location of said catcher.

12. In a sewing machine employing a stitching thread and a loop locking thread, means for carrying a loop of the stitching thread through the work, a reciprocatory carrier for the locking thread adapted to lay a loop of said thread through the stitching thread loop, means for varying the stroke of said carrier, and a reciprocatory catcher comprising a member movable transversely to said locking thread loop carrier in a fixed path, a member movable on said first mentioned member in the direction in which said loop carrier reciprocates and having a blade disposed transversely to said loop carrier and adapted to engage and hold the locking thread loop during the back stroke of the carrier, and means for adjusting and holding said two catcher members with respect to each other.

13. In a sewing machine employing a stitching thread and a loop locking thread, a needle adapted to take a loop of the stitching thread through the work and to spread open said loop, means for laying a loop of the locking thread through the loop of the stitching thread while the needle is in the work, means for holding said spread open stitching thread loop in its own plane while the locking thread loop is being laid therethrough, and means for adjusting the length of said locking thread loop.

Signed at St. Louis, Missouri, this 4th day of October, 1912.

CHARLES E. MYERS.

Witnesses:
G. A. PENNINGTON,
PAULINE AMBERG.